United States Patent [19]
Seo

[11] Patent Number: 5,123,721
[45] Date of Patent: Jun. 23, 1992

[54] DEVICE FOR SECURING PERIPHERAL EQUIPMENT OF COMPUTER

[75] Inventor: Dongki Seo, Suwon, Rep. of Korea

[73] Assignee: Samsung Electronics Co., Ltd., Kyunggi, Rep. of Korea

[21] Appl. No.: 625,472

[22] Filed: Dec. 11, 1990

[30] Foreign Application Priority Data

Jul. 11, 1990 [KR] Rep. of Korea .................. 90-10168

[51] Int. Cl.$^5$ ............................................. A47B 47/02
[52] U.S. Cl. ...................................... 312/333; 312/319
[58] Field of Search ............... 312/319, 333, 12, 13; 361/399

[56] References Cited

U.S. PATENT DOCUMENTS 3,199,938 8/1965 Vouk .................................... 312/333
4,030,788 6/1973 Bleeker ........................... 312/319 X Primary Examiner—Joseph Falk
Attorney, Agent, or Firm—Cushman, Darby & Cushman

[57] ABSTRACT

A device for securing a peripheral equipment of computer is disclosed, and the device includes: a front plate of computer kept in an open state for receiving the peripheral equipment; a guide slot formed within the computer body; and flexible members installed on the opposite sides of the peripheral equipment. One end of the elastic member is elastically supported against the sides of the guide slot, and the other end of it is coupled with the front plate of the computer body. The flexible member is provided with a restraining portion and a clip portion, and the restraining portion is formed in an arcuate shape, while the clip portion includes a first, second and third bent portions. According to the present invention, no fastening tools are required, and therefore, the productivity is improved.

4 Claims, 3 Drawing Sheets

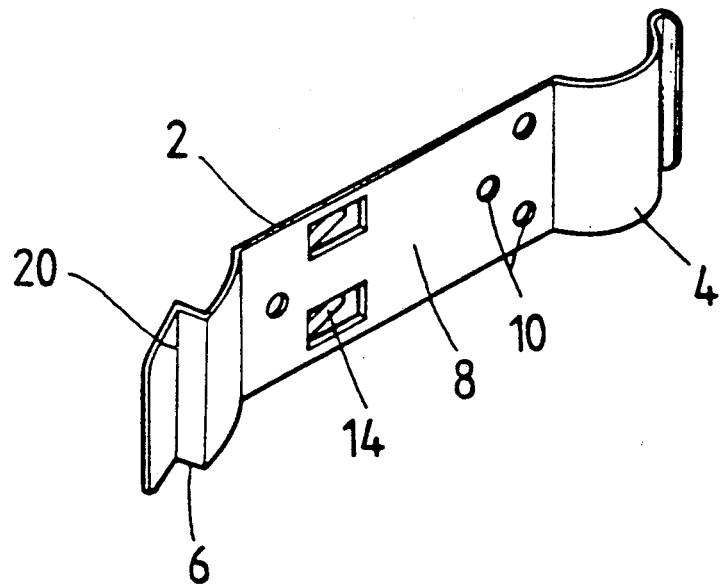
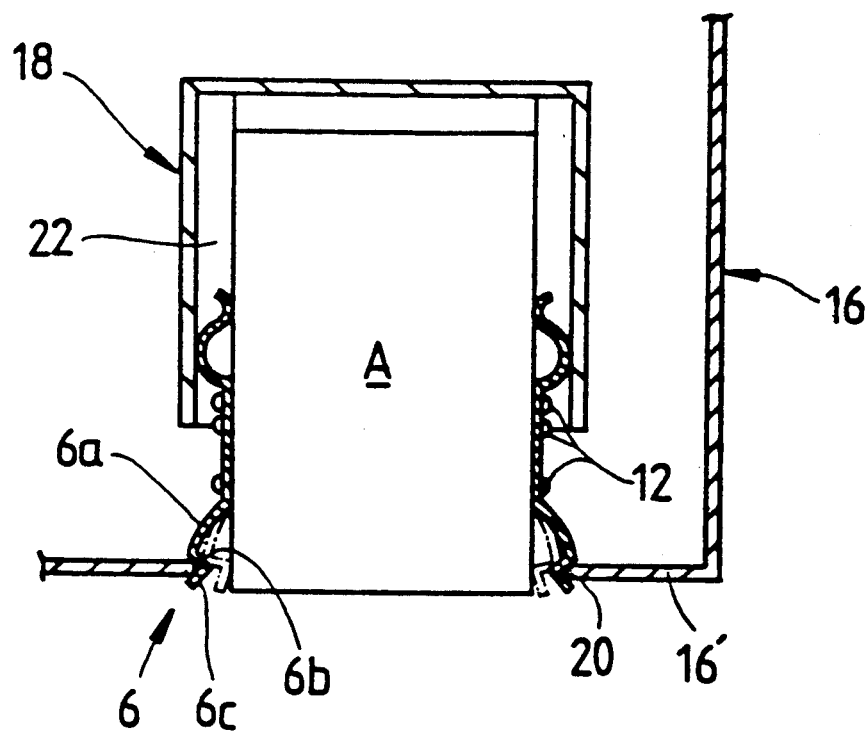

DEVICE FOR SECURING PERIPHERAL EQUIPMENT OF COMPUTER

BACKGROUND OF THE INVENTION

1. Field of the invention

The present invention relates to a device for securing the peripheral equipment of computer, and particularly to a peripheral equipment securing device in which the peripheral equipment can be secured or detached without using any fastening tools.

2. Description of the Prior Art

As is well known, a computer consists of a central processing unit, a number of peripheral devices, terminals and off-line devices, thereby forming one whole complete system.

Among them, the peripheral equipment includes auxiliary memory devices, input/output devices, and process input/output devices for a control section which are mostly installed within the main body of the computer where the central processing unit is installed.

FIG. 1 illustrates an example of an installation of an auxiliary memory device such as a floppy disc driver according to the conventional technique. As shown in this drawing, a pair of securing brackets D are fixedly installed to a side of the auxiliary memory device A by means of bolts C, and a pair of guide slots E are formed in a main body D. The securing brackets B are inserted into the guide slots E, and then, the front portions of the securing brackets B are fastened to the main body D by means of bolts F, thereby completing the installation of the peripheral equipment.

In such a securing method, however, the securing brackets B are fastened to the auxiliary memory device A by means of bolts C, and thereafter, the securing brackets B are fastened to the main body D by means of other bolts F, with the result that too many components are required. Accordingly, the working time is extended, whereby the productivity is lowered. Further, if the secured auxiliary memory device is to be detached, the unfastening process is extended because of many bolts have to be loosened, thereby aggravating the working efficiency.

SUMMARY OF THE INVENTION

The present invention is intended to overcome the above described disadvantages of the conventional devices.

Therefore, it is the object of the present invention to provide a mechanism for securing the peripheral equipment of computer, in which the attachment and detachment of the peripheral equipment are facilitated, thereby improving the productivity.

In achieving the above object, the device of the present invention comprises: a front plate of the computer body kept in an open state for receiving the peripheral equipment; a guide slot formed within the computer body; and flexible members fixedly installed on the opposite sides of the peripheral equipment, with one end of it being elastically supported against the guide slot, and with the other end of it being coupled with the front plate of the computer body. The elastic member is provided with a restraining portion at one end of it, and an clipping portion is formed at the other end of it. The restraining portion takes an arcuate form, and the clipping portion is provided with an engaging recess.

BRIEF DESCRIPTION OF THE DRAWINGS

The above object and other advantages of the present invention will become more apparent by describing with respect to the drawings.

FIG. 2 is a perspective view of the flexible member according to the present invention;

FIG. 3 is a plan view showing a state in which the flexible members of the present invention are fixedly installed on the opposite sides of the peripheral equipment;

DESCRIPTION OF THE PREFERRED EMBODIMENT

Figure 1:
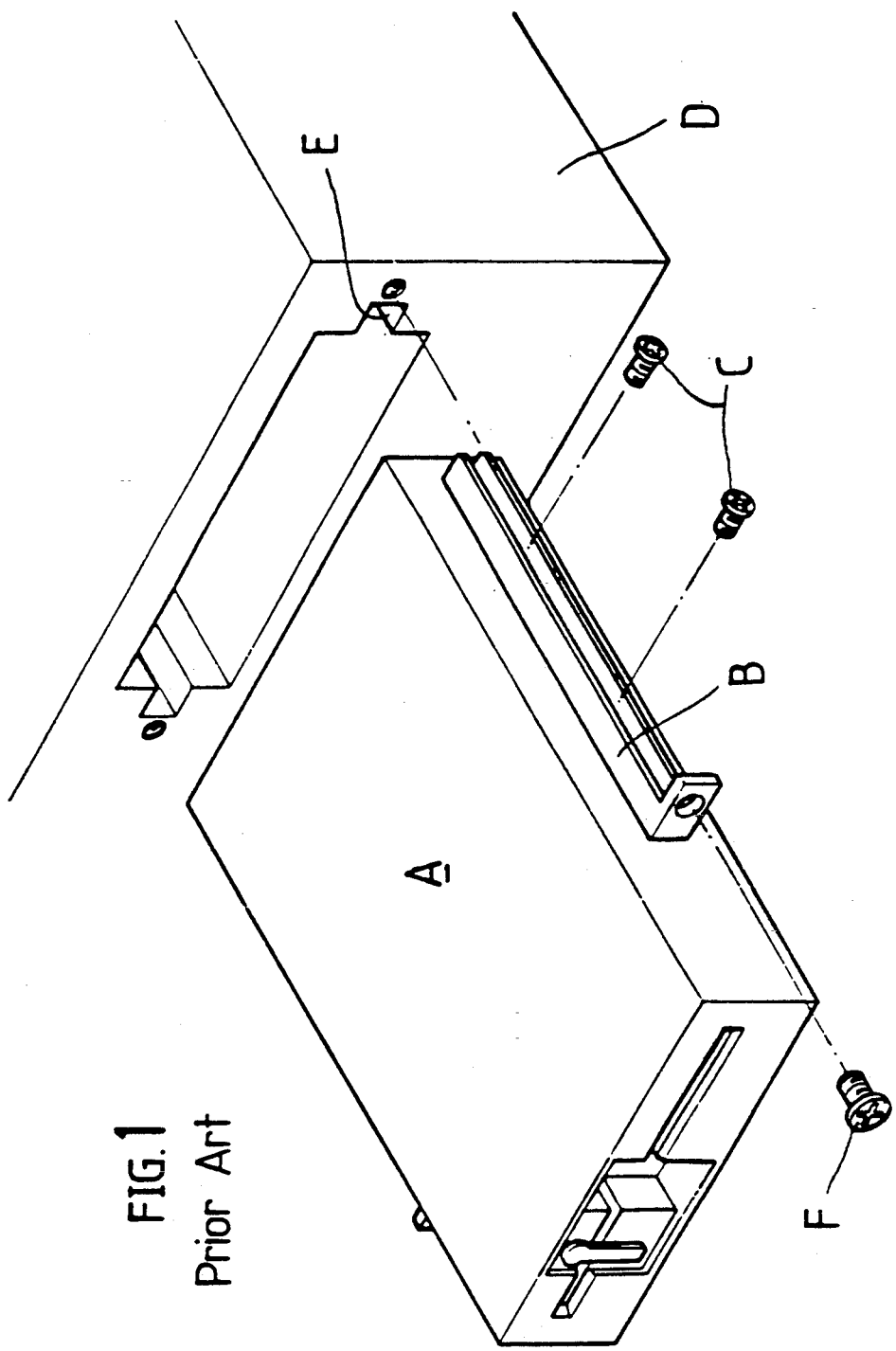
FIG. 1 illustrates an example of installing an auxiliary memory device such as a floppy disc driver according to the conventional technique.

FIG. 2 illustrates an elastic member according to the present invention, and this elastic member 2 is made of a thin metal plate having the shape of a strip. The elastic member 2 is provided with a restraining portion 4 at one end thereof, and an elastic supporting portion 6 in the form of a clip at the other end of thereof. The restraining portion 4 and the elastic supporting portion 6 are interconnected through an attaching portion 8 in an integral form. The attaching portion 8 is provided with a plurality of holes 10, through which the elastic members 2 are fixedly attached to the peripheral equipment A by using bolts 12 as shown in FIG. 3, while elastic supporting pieces 14 are protruded from the attaching side of the attaching portion 8.

In the preferred embodiment of the present invention, the holes 10 are dispersed to the left and right sides of the elastic supporting pieces 14, but the positions of the holes 10 are not limited to this form, the holes 10 being concentrable to one place depending on the size of the peripheral equipment.

In the case where the holes 10 are concentrated to a single place, it is desirable that they are positioned at the centre of the attaching portion 8. The elastic supporting pieces 14 are formed to restrain movements of the elastic member 2 when the bolts 12 are slightly loosened, and therefore, they are not absolutely required. The restraining portion 4 is formed in an arcuate shape having a predetermined curvature, and is elastically supported against the vertical face of a guide board 18 of a computer body 16, as shown in FIG. 3. The restraining portion 4 which is projected in an arcuate form can exert an elastic force, and this portion does not have to be exactly arcuate, but other forms may be possible too.

Figure 4:
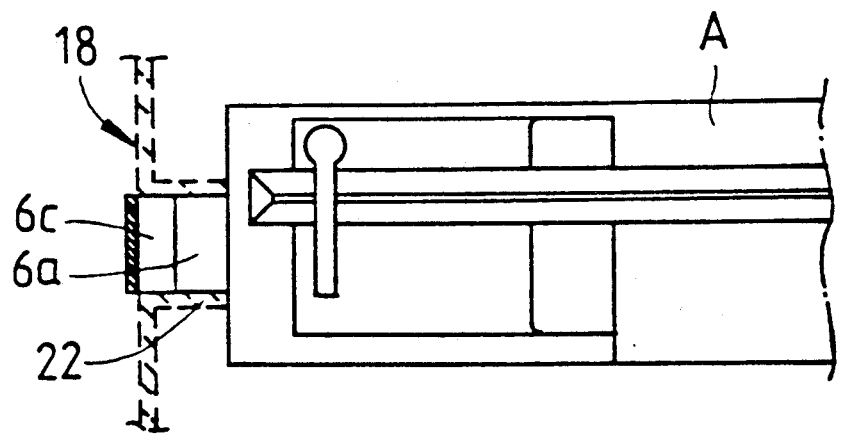
FIG. 4 is a front view of the coupled state of the peripheral equipment, showing only a part of the securing device of the present invention.

As seen in FIG. 3, the clipping portion 6 which is formed at the other end of the elastic member 2 consists of a first bent portion 6a, a second bent portion 6b and a third bent portion 6c, these portions being formed in a zig-zag shape. The second bent portion 6b and the third bent portion 6c together form a V-shaped recess or notch. Meanwhile, as shown in FIG. 4, the guide board 18 is provided with a pair of vertical extending portions 22, so that the elastic member 2 can be inserted between the pair of the horizontal extending portion 22.

In this device for securing the peripheral equipment of computer, the elastic members 2 are secured to the opposite side faces of the peripheral equipment A by means of bolts 12, and in this state, the peripheral equipment is pushed between the horizontal extending portions 22 of the guide board 18, in such a manner that the restraining portions 4 should closely contact the vertical face extending from the guide board 18. In the process of inserting the peripheral equipment A, when the first bent portion 6a of the elastic member 2 is contacted with the front plate 16' (FIG. 3) of the computer body 16, if the peripheral equipment A is pushed into the computer body 16 an increased force, the first bent portion 6a is deflected back to the peripheral equipment (A) producing an elastic deformation, and owing to the such an elastic deformation of the elastic member 2, the peripheral equipment A is inserted into the computer body 16 more deeply. When the first bent portion 6a passes the front plate 16' of the computer body 16, the elastic members 2 spring back to the original position at the point where the insertion is completed. Thereupon, the leading edge of the front plate 16' is engaged into the V-shaped recess formed between the second and third bent portions 6b, 6c, thereby securing the peripheral equipment A.

Meanwhile, if the peripheral equipment A is to be detached, the peripheral equipment A is pulled out with the third bent portion 6c retracted, so that the peripheral equipment should be easily pulled out.

Figure 5:
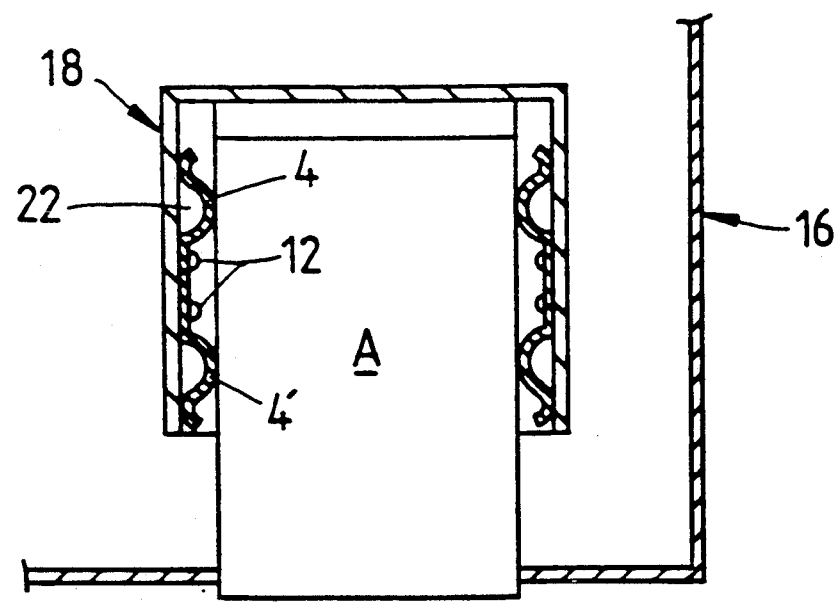
FIG. 5 illustrates a state in which the appearance of the flexible members of FIG. 2 are transformed, and the transformed-flexible members are fixed on the side faces of a guide board.

FIG. 5 illustrates another embodiment.

Hereupon, the appearance of the elastic members 2' is transformed, and restraining portions 4' are provided, instead of providing three bent portions as described above.

The elastic members 2' formed in this way were fixed by means of bolts 12 on the side walls of the guide board 18, and the elastic members were not fixed on the peripheral equipment A, whereby the elastic members need not be install on each peripheral equipment in case of replacing the peripheral equipment.

According to the present invention as described above, the attachment and detachment of a peripheral equipment to and from the computer body can be easily carried out by installing elastic members onto the opposite side faces of the peripheral equipment or on the side faces of the guide board and when assembled, externally caused impacts can be dampened because the restraining portions of the elastic members fixed on the opposite side faces are elastically supported against the side faces of the guide board or the restraining portions of the elastic members fixed on the side faces of the guide board are elastically supported against the side faces of the peripheral equipment.

What is claimed is:

1. A mechanism for securing peripheral equipment in a guide slot located in a face plate of a computer body, said slot including horizontal support means for supporting the equipment in a horizontal plane, lateral support means located on each side of said guide slot for laterally supporting the equipment, said mechanism comprising: a pair of opposed flexible members adapted for engagement between opposed sides of said peripheral equipment and opposed lateral sides of said guide slot thereby to restrain movement of said equipment when inserted into said guide slot, each flexible member including a restraining portion at one end thereof for frictionally engaging one of said peripheral equipment and said lateral support surfaces and a clipping means located at the other end thereof for engaging the face plate of said computer body when said equipment is inserted therein, each of said flexible members being fixedly attached to one of said peripheral equipment and said lateral support means.

2. The device for securing a peripheral equipment of computer as claimed in claim 1, wherein said restraining portion is formed in an arcuate shape.

3. The mechanism for securing a peripheral equipment of computer as claim in claim 1, wherein said clipping means consists of a first bent portion, a second bent portion, and a third bent portion, and a notched recess being formed between said second and third bent portions.

4. The mechanism for securing a peripheral equipment of computer as claimed in claim 1, wherein said flexible members are fixed on each side of said guide slot, and each end of each member is frictionally supporting against the opposed sides of said peripheral equipment.

* * * * *